United States Patent
Kamo et al.

(10) Patent No.: US 12,327,693 B2
(45) Date of Patent: Jun. 10, 2025

(54) HIGH VOLTAGE FEED-THROUGH CAPACITOR

(71) Applicant: TDK CORPORATION, Tokyo (JP)

(72) Inventors: Yuta Kamo, Tokyo (JP); Hisashi Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 204 days.

(21) Appl. No.: 18/353,527

(22) Filed: Jul. 17, 2023

(65) Prior Publication Data
US 2024/0071692 A1    Feb. 29, 2024

(30) Foreign Application Priority Data
Aug. 23, 2022 (JP) .................. 2022-132421

(51) Int. Cl.
*H01G 4/35* (2006.01)
*H01G 4/012* (2006.01)

(52) U.S. Cl.
CPC ............... *H01G 4/35* (2013.01); *H01G 4/012* (2013.01)

(58) Field of Classification Search
CPC .................. H01G 4/35; H01G 4/012
USPC .................. 361/301.4, 302, 306.3, 307
See application file for complete search history.

(56) References Cited

U.S. PATENT DOCUMENTS

| | | | | |
|---|---|---|---|---|
| 4,370,698 A | * | 1/1983 | Sasaki | H01G 4/224 361/675 |
| 4,814,938 A | * | 3/1989 | Arakawa | H01J 23/15 361/302 |
| 10,589,107 B2 | * | 3/2020 | Seitz | H01G 4/224 |
| 2001/0036053 A1 | | 11/2001 | Asada et al. | |

FOREIGN PATENT DOCUMENTS

JP    2001-351830 A    12/2001

* cited by examiner

*Primary Examiner* — Arun Ramaswamy
(74) *Attorney, Agent, or Firm* — Oliff PLC

(57) ABSTRACT

A high voltage feed-through capacitor includes an element body, a first electrode, a second electrode and a through-conductor. The element body includes a first main surface and a second main surface facing away from each other. A through-hole is formed in the element body and opens in the first main surface and the second main surface. The first electrode is disposed on the first main surface. The second electrode is disposed on the second main surface. The through-conductor is inserted through the through-hole and electrically connected to the first electrode. An opening area of the through-hole in the second main surface is larger than an opening area of the through-hole in the first main surface.

13 Claims, 5 Drawing Sheets

HIGH VOLTAGE FEED-THROUGH CAPACITOR

TECHNICAL FIELD

The present disclosure relates to a high voltage feed-through capacitor.

The present application is based upon and claims the benefit of the priority from Japanese patent application No. 2022-132421, filed on Aug. 23, 2022, which is hereby incorporated by reference in its entirety.

BACKGROUND

A known high voltage feed-through capacitor includes an element body, a first electrode, a second electrode, and a through-conductor (see Japanese Patent Application Laid-Open No. 2001-351830, for example). A through-hole is formed in the element body. The first electrode and the second electrode are provided on both surfaces of the element body. The through-hole opens in the both surfaces. The through-conductor is inserted through the through-hole and electrically connected to the first electrode.

SUMMARY

It is an object of one aspect of the present disclosure to provide a high voltage feed-through capacitor with improved reliability.

A high voltage feed-through capacitor according to one aspect of the present disclosure includes an element body, a first electrode, a second electrode and a through-conductor. The element body includes a first main surface and a second main surface facing away from each other. A through-hole is formed in the element body and opens in the first main surface and the second main surface. The first electrode is disposed on the first main surface. The second electrode is disposed on the second main surface. The through-conductor is inserted through the through-hole and electrically connected to the first electrode. An opening area of the through-hole in the second main surface is larger than an opening area of the through-hole in the first main surface.

The present inventors have investigated and studied a high voltage feed-through capacitor with improved reliability. As a result, the present inventors have newly found the following matters.

The strength of the electric field formed between the two conductors, the second electrode and the through-conductor, affects the reliability of the high voltage feed-through capacitor. Hereinafter, the strength of the electric field formed between the second electrode and the through-conductor may be simply referred to as "interconductor electric field strength". The dielectric breakdown is likely to occur in a high voltage feed-through capacitor having a high interconductor electric field strength. The dielectric breakdown is caused by, for example, a discharge along the inner surface of the element body defining the through-hole. Therefore, in the high voltage feed-through capacitor adopting a configuration for reducing the interconductor electric field strength, the dielectric breakdown is less likely to occur. That is, the high voltage feed-through capacitor adopting the configuration for reducing the interconductor electric field strength improves the reliability.

The present inventors have investigated and studied the configuration for reducing the interconductor electric field strength. As a result, the present inventors have found that a configuration in which the opening area of the through-hole in the second main surface is larger than the opening area of the through-hole in the first main surface increases the distance between the second electrode and the through-conductor and then decreases in the interconductor electric field strength.

In the one aspect, the through-hole may include an enlarged portion in which a size of the through-hole is enlarged at an end portion close to the second main surface. In this case, by the enlarged portion, the opening area in the second main surface of the through-hole can be made larger than the opening area in the first main surface of the through-hole.

In the one aspect, the enlarged portion may have a tapered shape in which a size of the through-hole is enlarged toward the second main surface. In this case, compared to a configuration in which the enlarged portion does not have the tapered shape, it is possible to increase the distance between the second electrode and the through-conductor while suppressing a decrease in the volume of the element body due to the through-hole. Therefore, it is possible to further reduce the interconductor electric field strength while maintaining the performance of the capacitor.

In the one aspect, an angle formed by an inner surface of the enlarged portion and the second main surface may be 90 degrees or more and 135 degrees or less. In this case, the interconductor electric field strength can be effectively reduced.

The high voltage feed-through capacitor according to the one aspect may further include a resin filled in the through-hole so as to surround the through-conductor. In this case, insulation between the second electrode and the through-conductor can be enhanced.

In the one aspect, the opening area of the through-hole in the second main surface may be 1.1 times or more and 9 times or less the opening area of the through-hole in the first main surface. In this case, the interconductor electric field strength can be effectively reduced.

DETAILED DESCRIPTION

Figure 1:
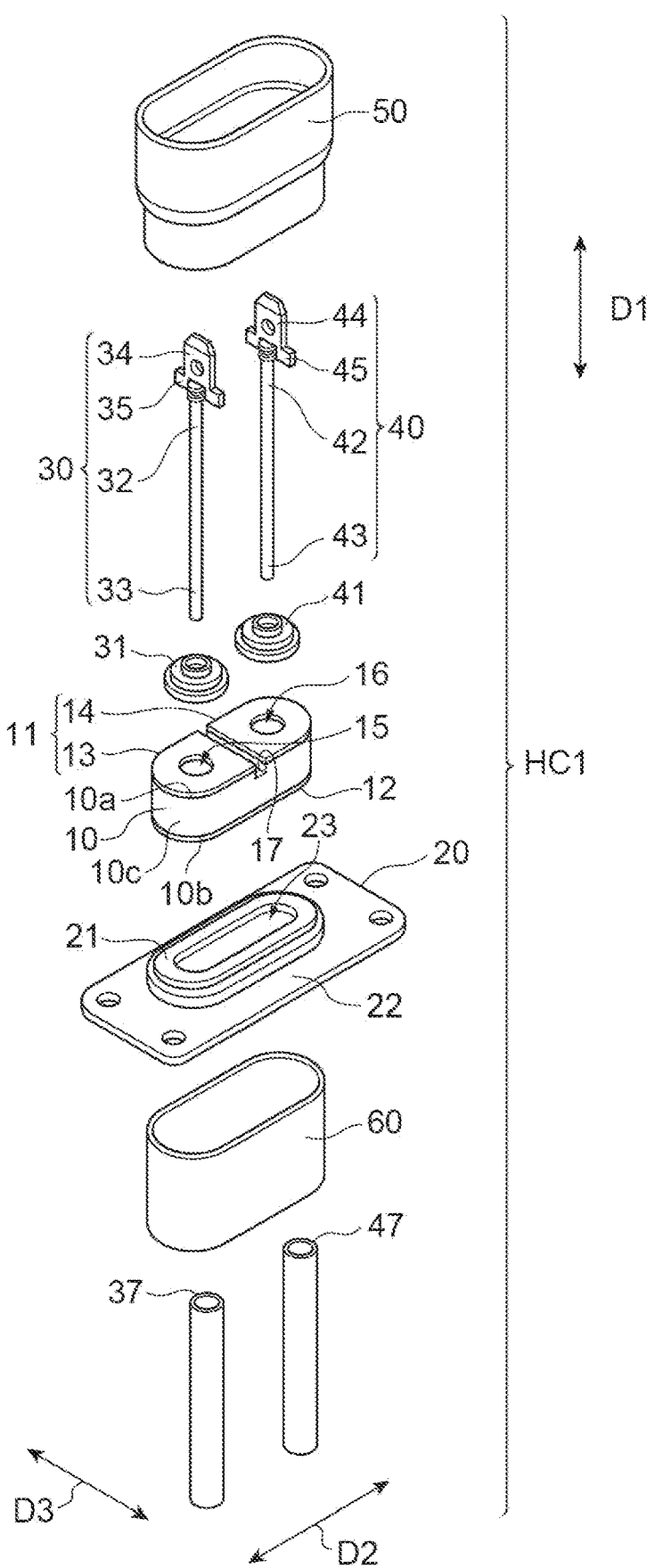
FIG. 1 is an exploded perspective view illustrating a high voltage feed-through capacitor according to an embodiment.

Hereinafter, embodiments of the present invention will be described in detail with reference to the accompanying drawings. In the description, the same reference numerals are used for the same elements or elements having the same functions, and redundant description will be omitted.

Figure 2:
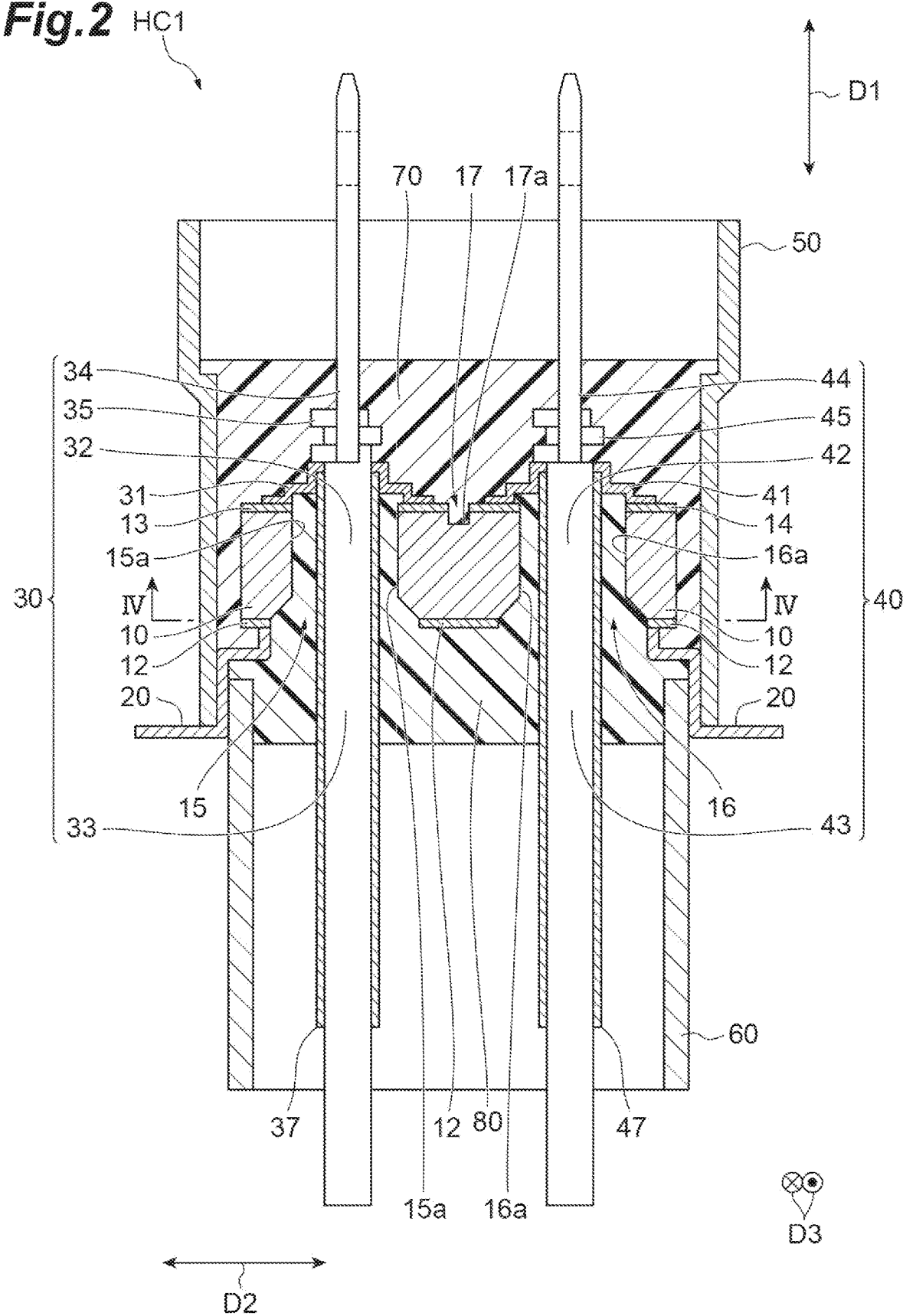
FIG. 2 is a diagram illustrating a cross-sectional configuration of the high voltage feed-through capacitor according to the present embodiment.
Figure 3:
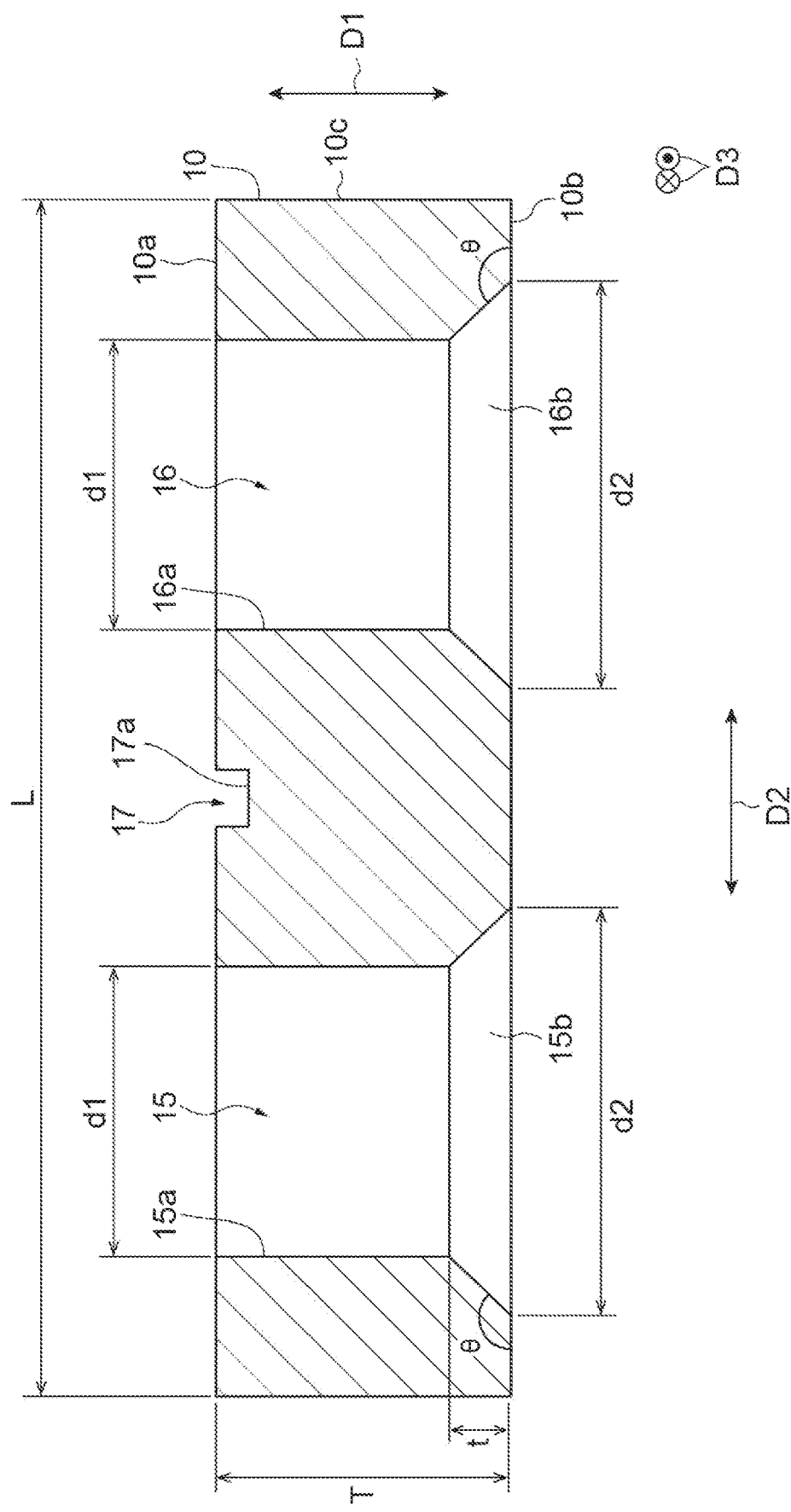
FIG. 3 is a diagram illustrating a cross-sectional configuration of an element body.
Figure 4:
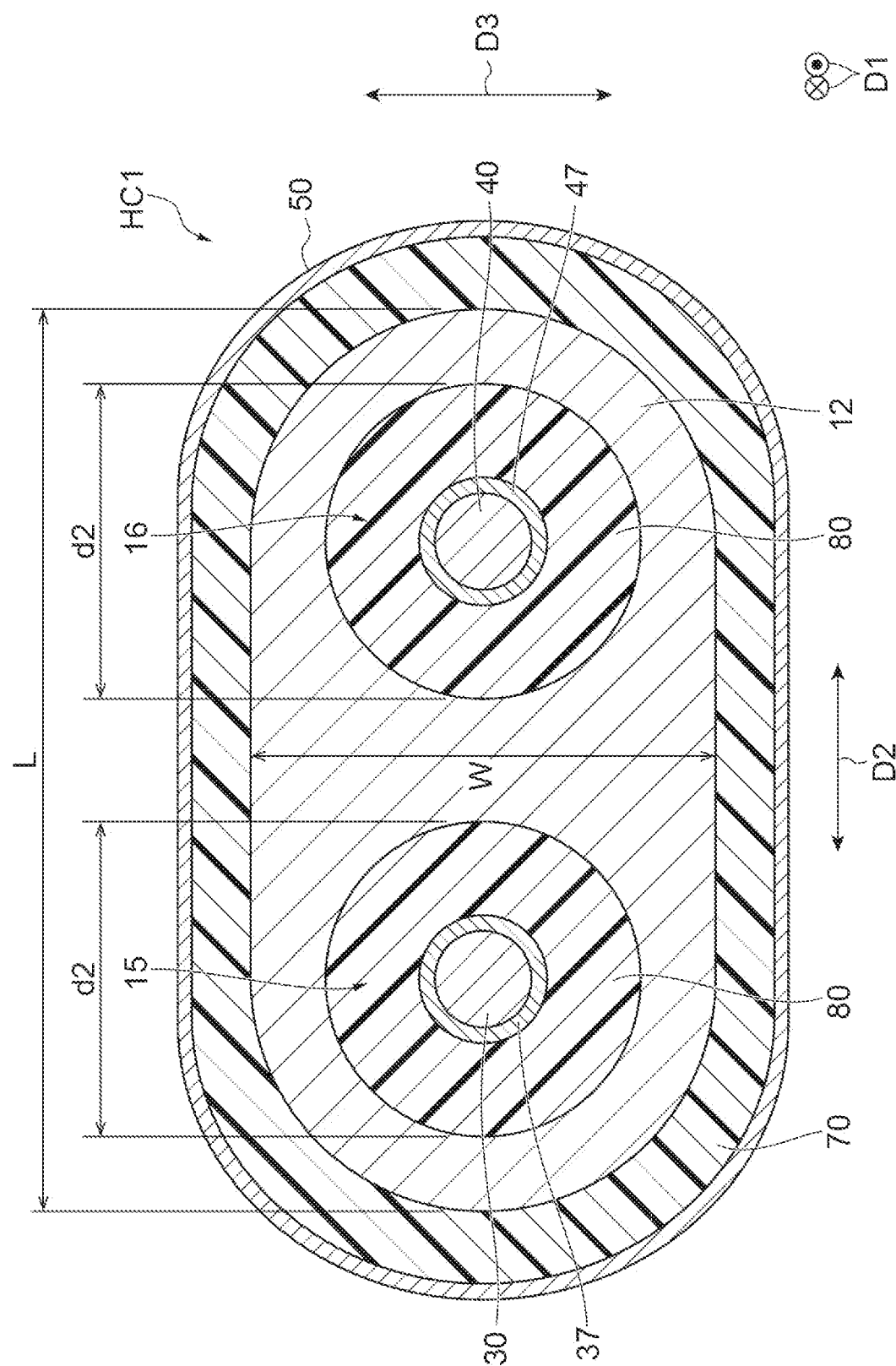
FIG. 4 is a cross-sectional view taken along line IV-IV in FIG. 2.

The configuration of a high voltage feed-through capacitor HC1 according to the present embodiment will be described with reference to FIGS. 1 to 4. FIG. 1 is an exploded perspective view illustrating a high voltage feed-through capacitor according to an embodiment. FIG. 2 is a diagram illustrating a cross-sectional configuration of the high voltage feed-through capacitor according to the present embodiment. FIG. 3 is a diagram illustrating a cross-sectional configuration of an element body. FIG. 4 is a cross-sectional view taken along line IV-IV in FIG. 2.

As shown in FIGS. 1 and 2, the high voltage feed-through capacitor HC1 includes an element body 10, a first electrode 11, a second electrode 12, a metal fitting 20, a plurality of through-conductors 30 and 40, a plurality of electrode connectors 31 and 41, a plurality of insulating tubes 37 and 47, an insulating case 50, an insulating cover 60, a resin 70, and a resin 80. In the present embodiment, the high voltage feed-through capacitor HC1 includes two through-conductors 30 and 40, two electrode connectors 31 and 41 and two insulating tubes 37 and 47.

As shown in FIGS. 1 and 3, the element body 10 includes a first main surface 10a and a second main surface 10b that face away from each other. In the present embodiment, the first main surface 10a and the second main surface 10b face away from each other in a first direction D1. The first main surface 10a and the second main surface 10b define both end surfaces of the element body 10 in the first direction D1. The element body 10 includes a side wall surface 10c. The side wall surface 10c extends in the first direction D1 to connect the first main surface 10a and the second main surface 10b. The side wall surface 10c defines the outer periphery of the element body 10 as viewed from the first direction D1. In this specification, the direction from the second main surface 10b toward the first main surface 10a is the upward direction, and the first main surface 10a is located above the second main surface 10b.

The element body 10 includes, for example, insulating material. The element body 10 includes, for example, ceramic. Ceramic include, for example, $BATiO_3$, $BaZrO_3$, $CaTiO_3$, or $MgTiO_3$. The element body may include additives added to the ceramic. The additives include, for example, Si, Mg, Zr, Zn, Y, V, Al, or Mn.

As shown in FIGS. 1 and 2, the first electrode 11 is disposed on the first main surface 10a and the second electrode 12 is disposed on the second main surface 10b. The first electrode 11 and the second electrode 12 oppose each other in the first direction D1. The element body 10 is located between the first electrode 11 and the second electrode 12. Thus, the first electrode 11 and the second electrode 12 are indirectly opposing each other in the first direction D1 with the element body 10 located between the first electrode 11 and the second electrode 12. The first electrode 11 includes a pair of conductors 13 and 14. The conductors 13 and 14 are disposed on the first main surface 10a. The conductors 13 and 14 are spaced apart from each other on the first main surface 10a. In the present embodiment, the conductors 13 and 14 are spaced apart from each other in a second direction D2 across the first direction D1. The conductors 13 and 14 oppose the second electrode 12 in the first direction D1.

The first electrode 11 and the second electrode 12 include conductive metal materials. The conductive metal materials include, for example, Ag. The first electrode 11 and the second electrode 12 may include magnetic material in addition to the conductive metal materials. The magnetic material is, for example, Fe, Co, Ni, Cu, or Sr, or a combination thereof. The first electrode 11 and the second electrode 12 are formed, for example, by baking conductive paste applied to the first main surface 10a and the second main surface 10b. The conductive paste for forming the first electrode 11 and the second electrode 12 includes the conductive metal materials.

As shown in FIGS. 1 to 4, a plurality of through-holes 15 and 16 are formed in the element body 10. In the present embodiment, two through-holes 15 and 16 are formed in the element body 10. The two through-holes 15 and 16 have the same shape. The element body 10 has an inner surface 15a defining the through-hole 15 and an inner surface 16a defining the through-hole 16. The through-hole 15 opens in the first main surface 10a and the second main surface 10b. The through-hole 15 penetrates from the first main surface 10a to the second main surface 10b. The through-hole 15 penetrates the element body 10 in the first direction D1. The through-hole 16 opens in the first main surface 10a and the second main surface 10b. The through-hole 16 penetrates from the first main surface 10a to the second main surface 10b. The through-hole 16 penetrates the element body 10 in the first direction D1.

The opening area of each of the through-holes 15 and 16 in the second main surface 10b is larger than the opening area of each of the through-holes 15 and 16 in the first main surface 10a. The opening area of each of the through-holes 15 and 16 in the second main surface 10b is 1.1 times or more and 9 times or less the opening area of each of the through-holes 15 and 16 in the first main surface 10a. As the opening area increases, the inter-electrode distance increases and the interconductor electric field strength can be reduced. The size of each of the through-holes 15 and 16 depends on the location in the first direction D1. The size of each of the through-holes 15 and 16 in the second main surface 10b is larger than the size of each of the through-holes 15 and 16 in the first main surface 10a. Here, the size of each of the through-holes 15 and 16 is the size of the inner side or inner circumference of each of the through-holes 15 and 16. The size of each of the through-holes 15 and 16 may be, for example, area of each of the through-holes 15 and 16 in a cross section orthogonal to the first direction D1, or maximum length of each of the through-holes 15 and 16 in the cross section orthogonal to the first direction D1.

In the present embodiment, the through-holes 15 and 16 have a circular shape in the cross section orthogonal to the first direction D1. The maximum length of each of the through-holes 15 and 16 in the cross section orthogonal to the first direction D1 is, for example, the inside diameter of each of the through-holes 15 and 16 in the cross section orthogonal to the first direction D1. In the cross section orthogonal to the first direction D1, the through-holes 15 and 16 may have a shape other than a circular shape. The maximum length d2 of each of the through-holes 15 and 16 in the second main surface 10b is longer than the maximum length d1 of each of the through-holes 15 and 16 in the first main surface 10a. The maximum length d2 is 1.1 times or more and 3 times or less the maximum length d1. The maximum d1 is, for example, 5 mm. The maximum length d2 is, for example, 7 mm.

The through-holes 15 and 16 have enlarged portions 15b and 16b at the end portions close to the second main surface 10b. In the enlarged portions, the sizes of the through-holes 15 and 16 are enlarged. The enlarged portions 15b and 16b have tapered shapes in which the sizes of the through-holes 15 and 16 are enlarged toward the second main surface 10b. The inner surfaces 15b and 16b of the enlarged portions 15a and 16a are tapered surfaces and inclined relative to the first direction D1. The angle θ between each of the inner surfaces 15a and 16a and the second main surface 10b is 90 degrees or more and 135 degrees or less. When each of the enlarged portions 15b and 16b has a tapered shape, the angle θ is more than 90 degrees and 135 degrees or less.

A groove 17 is formed in the element body 10. In the present embodiment, the groove 17 is formed in the element body 10 so as to be positioned between the conductor 13 and the conductor 14 when viewed from a direction (the first direction D1) orthogonal to the first main surface 10a. The conductor 13 and the conductor 14 are separated by the groove 17. No electrode is formed in the groove 17. The element body has a wall surface 17a defining the groove 17. The groove 17 extends in the third direction D3 across the first direction D1 and the second direction D2. The groove 17 reaches both ends of the first main surface 10a in the third direction D3. In the present embodiment, the first direction D1, the second direction D2, and the third direction D3 are orthogonal to each other.

The thickness of the element body 10 (the length of the element body 10 in the first direction D1) T is, for example, 3 mm or more and 15 mm or less. The length of the element body 10 (the length of the element body 10 in the second direction D2) L is, for example, 10 mm or more and 30 mm or less. The width of the element body 10 (the length of the element body 10 in the third direction D3) W is, for example, 5 mm or more and 15 mm or less. As an example, the thickness T may be 4.6 mm or more and 7 mm or less, the length L may be 18 mm, and the width W may be 8 mm. As another example, the thickness T may be 10 mm, the length L may be 28 mm, and the width W may be 12.2 mm. The thickness of each of the enlarged portions 15b and 16b (the length of each of the enlarged portions 15b and 16b in the first direction D1) is less than the thickness T, for example, 0.1 times or more and 0.5 times or less the thickness T.

The metal fitting 20 is electrically connected to the second electrode 12. The metal fitting 20 supports the element body 10. As shown in FIG. 1, the metal fitting 20 includes a protrusion 21 and a peripheral portion 22. The peripheral portion 22 surrounds the protrusion 21. The protrusion 21 protrudes from the peripheral portion 22 toward the element body 10 when viewed from the second direction D2. An opening 23 is formed in the protrusion 21. The opening 23 penetrates through the protrusion 21 in the first direction D1. In the present embodiment, the opening 23 is located in the central region of the protrusion 21 as viewed from the first direction D1. The metal fitting has a rectangular shape when viewed from the first direction D1. The rectangular shape includes a shape whose corners are rounded and a shape whose corners are chamfered. The metal fitting 20 may have a shape other than a rectangular shape. The metal fitting 20 includes conductive metal material. The conductive metal material includes, for example, Fe, Cu, or a Cu—Zn alloy.

The element body 10 is arranged such that the second electrode 12 is electrically connected to the metal fitting 20. In the present embodiment, the element body 10 is supported by the metal fitting 20 such that the protrusion 21 is in contact with the second electrode 12. The metal fitting 20 is grounded. The protrusion 21 and the second electrode 12 are connected via solder.

As shown in FIGS. 1 to 4, a through-conductor 30 is inserted through the through-hole 15. The through-conductor 30 is electrically connected to the first electrode 11. The through-conductor 30 includes a portion 32 located inside the through-hole 15, a portion 33 protruding from the second main surface 10b, a tab portion 34, and a swage 35. The portion 32 is spaced apart from the inner surface 15a. In the present embodiment, the portion 32 and the portion 33 are integrally formed. The portion 32 and the portion 33 are formed by conductor and have a cylindrical shape when viewed from the first direction D1. The outer diameter of the portion 32 is set so that the portion 32 does not come into contact with the inner surface 15a of the through-hole 15. The portion 32 and the portion 33 may have a shape other than a cylindrical shape. The tab portion 34 functions as a tab connector. The swage 35 electrically and physically connect the portion 32 and the portion 33 to the tab portion 34.

The through-conductor 30 is electrically connected to the conductor 13. In the through-conductor 30, the portion 32 and the portion 33 are passed through the electrode connector 31, the through-hole 15 and the opening 23. The electrode connector 31 electrically connects the tab portion 34 and swage 35 to the conductor 13. The through-conductor 30 is made of, for example, conductive metal material. The conductive metal material includes, for example, Fe, Cu, or a Cu—Zn alloy.

A through-conductor 40 is inserted through the through-hole 16. The through-conductor 40 is electrically connected to the first electrode 11. The through-conductor 40 includes a portion 42 located inside the through-hole 16, a portion 43 protruding from the second main surface 10b, a tab portion 44, and a swage 45. The portion 42 is spaced apart from the inner surface 16a. In the present embodiment, the portion 42 and the portion 43 are integrally formed. The portion 42 and the portion 43 are made of a conductor and have a cylindrical shape when viewed from the first direction D1. The outer diameter of the portion 42 is set so that the portion 42 does not come into contact with the inner surface 16a of the through-hole 16. The portion 42 and the portion 43 may have a shape other than a cylindrical shape. The tab portion 44 functions as a tab connector. The swage 45 electrically and physically connect the portion 42 and the portion 43 to the tab portion 44.

The through-conductor 40 is electrically connected to the conductor 14. In the through-conductor 40, the portion 42 and the portion 43 are passed through the electrode connector 41, the through-hole 16 and the opening 23. The electrode connector 41 electrically connects the tab portion 44 and swage 45 to the conductor 14. The through-conductor 40 is made of, for example, conductive metal material. The conductive metal material includes, for example, Fe, Cu, or a Cu—Zn alloy.

The insulating tube 37 covers the through-conductor 30 and is electrically insulating. The insulating tube 37 covers the portion 32 and the portion 33. In the present embodiment, the insulating tube 37 covers the entire portion 32 and a part of the portion 33. The region covered by the insulating tube 37, that is, the entire portion 32 and the part of the portion 33, passes through the through-hole 15 and the opening 23. The insulating tube 47 covers the through-conductor 40 and is electrically insulating. The insulating tube 47 covers the portion 42 and the portion 43. In the present embodiment, the insulating tube 47 covers the entire portion 42 and a part of the portion 43. The region covered by the insulating tube 47, that is, the entire portion 42 and the part of the portion 43, passes through the through-hole 16 and the opening 23. The insulating tubes 37 and 47 include insulating rubber. The insulating rubber includes, for example, silicone rubber.

The insulating case 50 has a hollow cylindrical shape. The insulating case 50 may have a shape other than a hollow cylindrical shape. The insulating case 50 houses the element body 10, the first electrode 11, and the second electrode 12 inside. In the present embodiment, the insulating case 50 houses the entire element body 10, the entire first electrode 11, the entire second electrode 12, a part of the metal fitting 20, and a part of the insulating cover 60 inside. The insulating case 50 is disposed above the insulating cover 60. The insulating case 50 is arranged to surround the element body 10. In the present embodiment, the insulating case 50 is arranged to surround the element body 10, the first electrode 11, the second electrode 12, the protrusion 21, the electrode connectors 31 and 41, the portions 32 and 42, the tab portions 34 and 44, and the swages 35 and 45. The insulating case 50 is physically connected to the metal fitting 20. The insulating case 50 is connected to the metal fitting 20 such that a surface included in the inner side surface of the insulating case 50 and located at the lower end of the insulating case 50 is in contact with the outer side surface of the protrusion 21. The lower end surface of the insulating case 50 is in contact with the upper surface of the peripheral portion 22.

The insulating cover 60 has a hollow cylindrical shape. The insulating cover 60 may have a shape other than a hollow cylindrical shape. The insulating cover 60 is arranged to surround the portion 33 and the portion 43. In the present embodiment, the insulating cover 60 is arranged to surround the portions 33 and 43 and the insulating tubes 37 and 47. The insulating cover 60 is physically connected to the metal fitting 20. As seen from the second direction D2 and the third direction D3, the insulating cover 60 is connected to the metal fitting 20 such that a surface included in the outer side surface of the insulating cover 60 and located at the upper end of the insulating cover 60 is in contact with the inner side surface of the protrusion 21.

The insulating case 50 and the insulating cover 60 include insulating material. The insulating material includes, for example, polybutylene terephthalate (PBT), polyethylene terephthalate (PET), or modified melamine. The insulating material may contain an inorganic substance. The inorganic material includes, for example, glass powder and ceramic powder. The glass powder includes, for example, industrial glass powder. The ceramic powder includes, for example, $SiO_2$ powder, $Al_2O_3$ powder, talc ($Mg_3Si_4O_{10}(OH)_2$), aluminum nitride (AlN), or silicon nitride ($Si_3N_4$), or a mixture thereof.

As shown in FIG. 2, the resin 70 is filled inside the insulating case 50. In the present embodiment, the resin 70 is filled inside the insulating case 50 so as to cover the element body 10. The resin 70 is located between the insulating case 50 and each of the element body 10, the protrusion 21, the electrode connectors 31 and 41, the tab portions 34 and 44, and the swages 35 and 45. The resin 70 bridges between the insulating case 50 and each of the protrusion 21, the element body 10, the electrode connectors 31 and 41, the tab portions 34 and 44, and the swages 35 and 45. The resin 70 is in contact with the element body 10, the first electrode 11, the metal fitting 20, the electrode connectors 31 and 41, through-conductors 30 and 40, and the insulating case 50. In the present embodiment, the resin 70 is in contact with the side wall surface 10c, the wall surface 17a, the first electrode 11, the protrusion 21, the electrode connectors 31 and 41, the tab portions 34 and 44, the swages 35 and 45, and the insulating case 50. The upper end edge of the resin 70 has reached a height such that the swages 35 and 45 are buried. The lower end edge of the resin 70 has reached the protrusion 21. The upper end edge of the resin 70 indicates an end edge positioned at an upper side among both end edges of the resin 70 in the first direction D1. The lower end edge of the resin 70 indicates an end edge positioned at a lower side among both end edges of the resin 70 in the first direction D1.

The resin 80 is filled inside the insulating cover 60. The resin 80 is filled inside the through-hole 15 so as to surround the through-conductor 30. The resin 80 is filled inside the through-hole 16 so as to surround the through-conductor 40. In the present embodiment, the resin 80 is filled inside the insulating cover 60 to reach a space between the inner surface 15a and the portion 32 and a space between the inner surface 16a and the portion 42. The resin 80 is filled to reach a space between the inner surface 15a and the insulating tube 37 and a space between the inner surface 16a and the insulating tube 47. The resin 80 fills between the insulating cover 60 and each of the inner surfaces 15a and 16a, the protrusion 21, and insulating tubes 37 and 47. The resin 80 is in contact with the element body 10, the second electrode 12, the metal fitting 20, insulating tubes 37 and 47, and the insulating cover 60. In the present embodiment, the resin 80 is in contact with inner surfaces 15a and 16a, the second electrode 12, the protrusion 21, insulating tubes 37 and 47, and the insulating cover 60. A part of the insulating tube 37 in contact with the resin 80 is at least located within the through-hole 15. A part of the insulating tube 47 in contact with the resin 80 is at least located within the through-hole 16. The upper end edge of the resin 80 reaches the lower surface of the electrode connectors 31 and 41. The lower end edge of the resin 80 is located below the lower surface of the peripheral portion 22. The upper end edge of the resin 80 indicates an end edge positioned at an upper side among both end edges of the resin 80 in the first direction D1. A lower end edge of the resin 80 indicates an end edge positioned at a lower side among both end edges of the resin 80 in the first direction D1.

The resin 70 and the resin 80 include insulating material. The insulating material includes, for example, thermosetting resin. The thermosetting resin includes, for example, epoxy resin, urethane resin, phenol resin, or silicone resin. The resin 70 and the resin 80 may include different insulating materials. In the present embodiment, the resin 70 and the resin 80 contain epoxy resin.

As described above, in the high voltage feed-through capacitor HC1, the opening area of each of the through-holes 15 and 16 in the second main surface 10b is larger than the opening area of each of the through-holes 15 and 16 in the first main surface 10a. This increases the distance between the second electrode 12 and each of the through-conductors 30 and 40, and then decreases interconductor electric field strength. Therefore, the dielectric breakdown is less likely to occur in the high voltage feed-through capacitor HC1. That is, according to the high voltage feed-through capacitor HC1, reliability can be improved. The opening area of each of the through-holes 15 and 16 in the second main surface 10b is 1.1 times or more and 9 times or less the opening area of each of the through-holes 15 and 16 in the first main surface 10a. Thus, the interconductor electric field strength can be effectively reduced.

The through-holes 15 and 16 include the enlarged portions 15b and 16b at the ends of the through-holes 15 and 16 close to the second main surface 10b. In the enlarged portions 15b and 16b, the sizes of the through-holes 15 and 16 are enlarged. Thus, the enlarged portions 15b and 16b allow the opening areas of the through-holes 15 and 16 in the second main surface 10b to be larger than the opening areas of the through-holes 15 and 16 in the first main surface 10a.

The enlarged portions 15b and 16b have a tapered shape in which the sizes of the through-holes 15 and 16 are enlarged toward the second main surface 10b. Therefore, compared to a configuration in which the enlarged portions 15b and 16b do not have the tapered shapes, the distances between the second electrode 12 and the through-conductors 30 and 40 can be increased while suppressing the decrease in the volumes of the element body 10 due to the through-holes 15 and 16. Therefore, it is possible to further reduce the interconductor electric field strength while maintaining the performance of the capacitor.

According to investigations and studies conducted by the present inventors, by making the angle θ an obtuse angle, the interconductor electric field strength can be effectively reduced. The angle θ is formed by the second main surface 10*b* and each of the inner surfaces 15*b* and 16*b* of the enlarged portions 15*a* and 16*a*. By making the angle θ larger than 90 degrees, the inter-electrode distance can be made longer and the interconductor electric field strength can be reduced. Therefore, electric field concentration at the end portion of the second electrode 12 can be prevented. As a result, suppression of the portion discharge can be expected. If the angle θ is larger than 135 degrees, the area of the second electrode 12 cannot be sufficiently secured. In the high voltage feed-through capacitor HC1, the angle θ is greater than 90 degrees and less than or equal to 135 degrees.

The high voltage feed-through capacitor HC1 further includes the resin 80 filled in the through-holes 15 and 16 so as to surround the through-conductors 30 and 40. Therefore, the insulation between the second electrode 12 and each of the through-conductors 30 and 40 can be enhanced. This suppresses discharge between the second electrode 12 and each of the through-conductors 30 and 40. Therefore, in the high voltage feed-through capacitor HC1, the discharge along the inner surfaces 15*a* and 16*a* of the through-holes 15 and 16 becomes a main factor of the dielectric breakdown. The resin 80 can also provide moisture resistance to the second electrode 12 and the through-conductors 30 and 40.

Although the embodiments of the present invention have been described above, the present invention is not necessarily limited to the above-described embodiments, and various modifications can be made without departing from the scope of the present invention.

Figure 5:
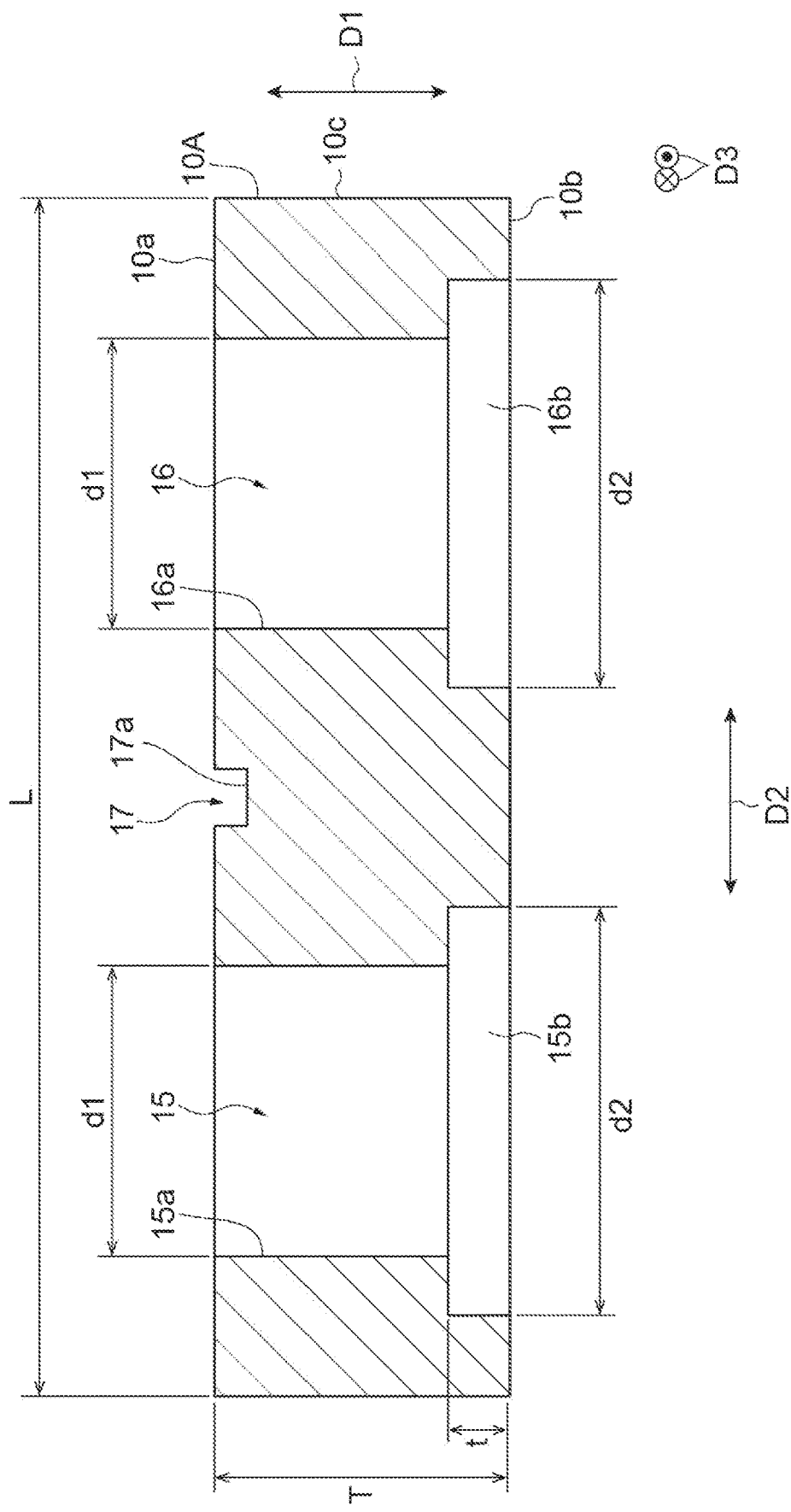
FIG. 5 is a diagram illustrating a cross-sectional configuration of an element body according to a modification.

FIG. 5 is a diagram illustrating a cross-sectional configuration of an element body according to a modification. As shown in FIG. 5, an element body 10A according to a modified example is different from the element body 10 (see FIG. 3) in that the enlarged portions 15*b* and 16*b* do not have a tapered shape. In the enlarged portions 15*b* and 16*b*, the size and shape of each of the through-holes 15 and 16 do not change with the first direction D1 position and are constant. That is, in the enlarged portions 15*b* and 16*b*, the areas of the through-holes 15 and 16 in the cross section orthogonal to the first direction D1 are the same as the opening areas of the through-holes 15 and 16 in the second main surface 10*b*. In the enlarged portions 15*b* and 16*b*, the maximum lengths of the through-holes 15 and 16 in a cross section perpendicular to the first direction D1 are the same as the maximum lengths d2. Even when the high voltage feed-through capacitor HC1 includes the element body 10A according to the modification, the opening areas of the through-holes 15 and 16 in the second main surface 10*b* are larger than the opening areas of the through-holes 15 and 16 in the first main surface 10*a*, and thus the interconductor electric field strengths are reduced. Therefore, reliability can be improved.

The high voltage feed-through capacitor HC1 includes two through-conductors 30 and 40, but the high voltage feed-through capacitor HC1 may include three or more through-conductors. The high voltage feed-through capacitor HC1 may include either through-conductor of the two through-conductors 30 and 40, that is, a single through-conductor. The numbers of through-holes formed in the element body 10, insulating tubes, conductors included in the first electrode 11, and electrode connectors may correspond to the numbers of through-conductors.

The above-described embodiments and modifications may be appropriately combined.

What is claimed is:

1. A high voltage feed-through capacitor comprising:
an element body including a first main surface and a second main surface facing away from each other, wherein a through-hole is formed in the element body and opens in the first main surface and the second main surface;
a first electrode disposed on the first main surface;
a second electrode disposed on the second main surface; and
a through-conductor inserted through the through-hole and electrically connected to the first electrode,
wherein an opening area of the through-hole in the second main surface is larger than an opening area of the through-hole in the first main surface.

2. The high voltage feed-through capacitor according to claim 1, wherein the through-hole includes an enlarged portion in which a size of the through-hole is enlarged at an end portion close to the second main surface.

3. The high voltage feed-through capacitor according to claim 2, wherein the enlarged portion has a tapered shape in which a size of the through-hole is enlarged toward the second main surface.

4. The high voltage feed-through capacitor according to claim 2, wherein an angle formed by an inner surface of the enlarged portion and the second main surface is 90 degrees or more and 135 degrees or less.

5. The high voltage feed-through capacitor according to claim 1, further comprising a resin filled in the through-hole so as to surround the through-conductor.

6. The high voltage feed-through capacitor according to claim 1, wherein the opening area of the through-hole in the second main surface is 1.1 times or more and 9 times or less the opening area of the through-hole in the first main surface.

7. The high voltage feed-through capacitor according to claim 2, wherein a length of the enlarged portion is 0.1 times or more and 0.5 times or less a length area of the through-hole.

8. The high voltage feed-through capacitor according to claim 1, wherein the through-hole has a circular shape.

9. The high voltage feed-through capacitor according to claim 1, wherein the through-hole includes two through-holes spaced apart from each other.

10. The high voltage feed-through capacitor according to claim 9, wherein the two through-holes have same shape.

11. The high voltage feed-through capacitor according to claim 5, wherein the resin includes insulating material.

12. The high voltage feed-through capacitor according to claim 1, further comprising a resin covering an outer surface of the element body.

13. The high voltage feed-through capacitor according to claim 12, wherein the resin includes insulating material.

* * * * *